US009494111B2

(12) United States Patent
Hang et al.

(10) Patent No.: US 9,494,111 B2
(45) Date of Patent: Nov. 15, 2016

(54) QUAD LAYER PASSAGE VARIABLE GEOMETRY TURBINE FOR TURBOCHARGERS IN EXHAUST GAS RECIRCULATION ENGINES

(71) Applicant: Kangyue Technology Co., Ltd, Shouguang, Shandong Province (CN)

(72) Inventors: Wang Hang, Shouguang (CN); Steven Don Arnold, Rancho Palos Verdes, CA (US); Yuan Daojun, Shouguang (CN); Li Yanzhao, Shouguang Development Area (CN); Sang Wuhai, Shouguang (CN)

(73) Assignee: KANGYUE TECHNOLOGY CO., LTD, Shouguang Development Zone (CN)

( * ) Notice: Subject to any disclaimer, the term of this patent is extended or adjusted under 35 U.S.C. 154(b) by 140 days.

(21) Appl. No.: 14/322,039

(22) Filed: Jul. 2, 2014

(65) Prior Publication Data

US 2016/0003196 A1 Jan. 7, 2016

(51) Int. Cl.
*F02B 33/44* (2006.01)
*F02M 25/07* (2006.01)
*F02B 37/22* (2006.01)
*F02D 41/00* (2006.01)
*F02B 37/02* (2006.01)
*F01D 17/10* (2006.01)
*F01D 9/02* (2006.01)
*F02B 29/04* (2006.01)

(52) U.S. Cl.
CPC .......... *F02M 25/0713* (2013.01); *F01D 9/026* (2013.01); *F01D 17/105* (2013.01); *F02B 37/025* (2013.01); *F02B 37/22* (2013.01); *F02D 41/0007* (2013.01); *F02D 41/0065* (2013.01); *F02M 26/10* (2016.02); *F02M 26/43* (2016.02); *F02B 29/0437* (2013.01); *F02M 26/05* (2016.02); *F05D 2220/40* (2013.01); *Y02T 10/144* (2013.01); *Y02T 10/47* (2013.01)

(58) Field of Classification Search
CPC ................. F02M 25/0713; F02B 37/22; F02B 37/025; F02D 41/0065; F01D 17/105; F05D 2220/40
USPC ................. 60/605.2, 605.1, 602; 123/568.21
See application file for complete search history.

(56) References Cited

U.S. PATENT DOCUMENTS 2,861,774 A * 11/1958 Buchi ...................... F01D 17/14
415/150
2007/0089415 A1* 4/2007 Shimokawa ............ F01D 9/026
60/605.2

(Continued)

*Primary Examiner* — Thomas Denion
*Assistant Examiner* — Thomas Olszewski
(74) *Attorney, Agent, or Firm* — Felix L. Fischer

(57) ABSTRACT

A variable geometry turbine for turbochargers in exhaust gas recirculation engines incorporates a turbine housing having an exhaust inlet with a first side receiving exhaust from cylinders having exhaust gas recirculation (EGR) and a second side receiving exhaust from non-EGR cylinders. The first side has a first EGR-driving passage and a second EGR-driving passage and the second side having a first non-EGR-driving passage and a second non-EGR-driving passage. A first control valve is associated with the second EGR-driving passage and a second control valve is associated with the second non-EGR-driving passage. A controller is adapted to control the first and second control valves.

20 Claims, 11 Drawing Sheets

(56) References Cited

U.S. PATENT DOCUMENTS

| | | | | |
|---|---|---|---|---|
| 2010/0024419 A1* | 2/2010 | Pierpont | ............... | F01N 13/107 60/624 |
| 2013/0219885 A1* | 8/2013 | Watson | ................... | F01D 9/026 60/605.1 |
| 2014/0102093 A1* | 4/2014 | Honma | ................. | F02B 37/013 60/602 |

* cited by examiner

US 9,494,111 B2

QUAD LAYER PASSAGE VARIABLE GEOMETRY TURBINE FOR TURBOCHARGERS IN EXHAUST GAS RECIRCULATION ENGINES

BACKGROUND OF THE INVENTION

1. Field of the Invention

This invention relates generally to the field of charge air boosting of internal combustion engines employing exhaust gas recirculation for emissions reduction and more particularly to a variable geometry turbine employing a four passage divided volute where two paired passages provide the necessary pressure differential to drive EGR, and the other two paired passages are relieved of the EGR-driving pressure differential requirement.

2. Description of the Related Art

Exhaust Gas Recirculation (EGR) has been the main technology used for NOx reduction in diesel engines in countries with stringent NOx emission targets. As Selective Catalytic Reduction (SRC) technology efficiency improves, it is supplanting EGR as the prime NOx reduction technology. However, SCR requires significant and wide spread infrastructure to support replenishment of urea for SCR engines as well as sophisticated sensor and control systems for On-Board Diagnostics (OBD) to prevent operators from tampering or circumventing the emissions control system.

Unfortunately, implementation of significant amounts of EGR result in a fuel consumption (and CO2 emission) penalty. The fuel consumption penalty is caused by the negative pressure gradient from the intake manifold to the exhaust manifold and the resulting pumping loss to the engine. As such, engine manufacturers have strived to innovate new boosting system technologies that are able to drive EGR while minimizing the fuel consumption penalty associated with the negative pressure gradient.

The main technology that has been used to create the negative pressure gradient while also maintaining the proper air/fuel ratio has been various types of Variable Geometry Turbocharger (VGT). A VGT provides a method of creating the appropriate negative pressure gradient while at the same time, increasing the boost so that additional gas flows through the engine. The additional gas is the diluent-cooled EGR. The EGR is additive to the fresh air that is needed for proper combustion, thus the total flow through the engine is increased. To increase the total flow through the engine, the density of the charge in the intake manifold must be increased, thus resulting in higher boost requirements from the boosting system.

As VGT is expensive and adds more failure modes to the engine system, some manufacturers have opted to use wastegated turbochargers, but with unequal volutes on the divided turbine housing; first volute 102 for receiving exhaust from engine cylinders not incorporating EGR and second volute 104 receiving exhaust from engine cylinders incorporating EGR as shown in FIG. 1. This is often referred to as "Asymmetrical Volute Turbocharging", and is less expensive than VGT for driving EGR. It also provides some filet economy benefit as the engine's cylinders that are not required to provide EGR can operate at a much lower negative pressure gradient or even at a positive pressure gradient. However, the control for EGR and air fuel ratio is not as precise as the VGT system. The schematic for this type of system is shown in FIG. 2 wherein a diesel engine 202 (having six cylinders 204a-204f for the example) is provided with a turbocharger 206 having a compressor 208 and turbine 210 with the turbine driving the compressor through a shaft 212. A charge air cooler 214 receives charge air from the compressor section 208 and provides the charge air to the engine inlet manifold 216. Exhaust from the engine cylinders is provided from three non-EGR cylinders 204a-204c to a first exhaust manifold 218. The first exhaust manifold 218 is connected to the first volute 102. Exhaust from three EGR cylinders 204d-204f is provided to a second exhaust manifold 220. The second exhaust manifold provides EGR through an EGR cooler 222 and a control valve 224 into the inlet manifold 216. The second exhaust manifold also provides flow into the second volute 104. The first and second volutes 102 and 104 provide exhaust flow to drive the turbine 210 with a wastegate 226 providing boost pressure control. Prior art unequal volute systems require a wastegate for boost control and do not provide any secondary control capability for EGR tailoring.

It is therefore desirable to provide a variable geometry turbine for use with EGR which does not require a wastegate. It is additionally desirable to separately control EGR flow and boost.

SUMMARY OF THE INVENTION

The embodiments of the present application describe a variable geometry turbine for turbochargers in exhaust gas recirculation engines which incorporates a turbine housing having an exhaust inlet with a first side receiving exhaust from cylinders having exhaust gas recirculation (EGR) and a second side receiving exhaust from non-EGR cylinders. The first side has a first EGR-driving passage and a second EGR-driving passage and the second side having a first non-EGR-driving passage and a second non-EGR-driving passage. A first control valve is associated with the second EGR-driving passage and a second control valve is associated with the second non-EGR-driving passage. A controller is adapted to control the first and second control valves.

The embodiments provide a method for exhaust recirculation control wherein exhaust is drawn from a plurality of non-EGR cylinders in an engine with a first exhaust manifold and exhaust is drawn from a plurality of EGR cylinders in the engine with a second exhaust manifold. Exhaust is received from the first exhaust manifold in a turbine exhaust inlet with a first side having a first EGR-driving passage and a second EGR-driving passage connected to the first exhaust manifold. Exhaust is controlled between the first EGR-driving passage and the second EGR-driving passage with a first control valve associated with the second EGR-driving passage to control back pressure for EGR flow. Exhaust is received from the second exhaust manifold in a second side of the turbine exhaust inlet having a first non-EGR-driving passage and a second non-EGR-driving passage connected to the second manifold. Exhaust flow is controlled between the first non-EGR-driving passage and the second non-EGR-driving passage with a second control valve associated with the second non-EGR-driving passage to control boost.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
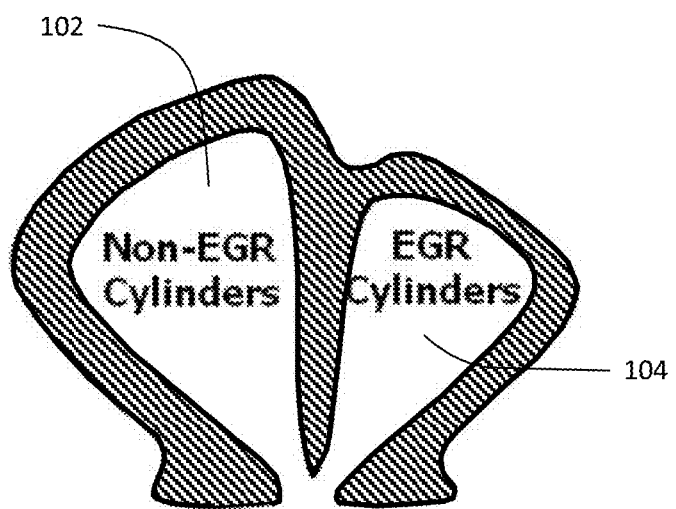
FIG. 1 is a section view of a prior art unequal volute for a turbocharger exhaust manifold.
Figure 2:
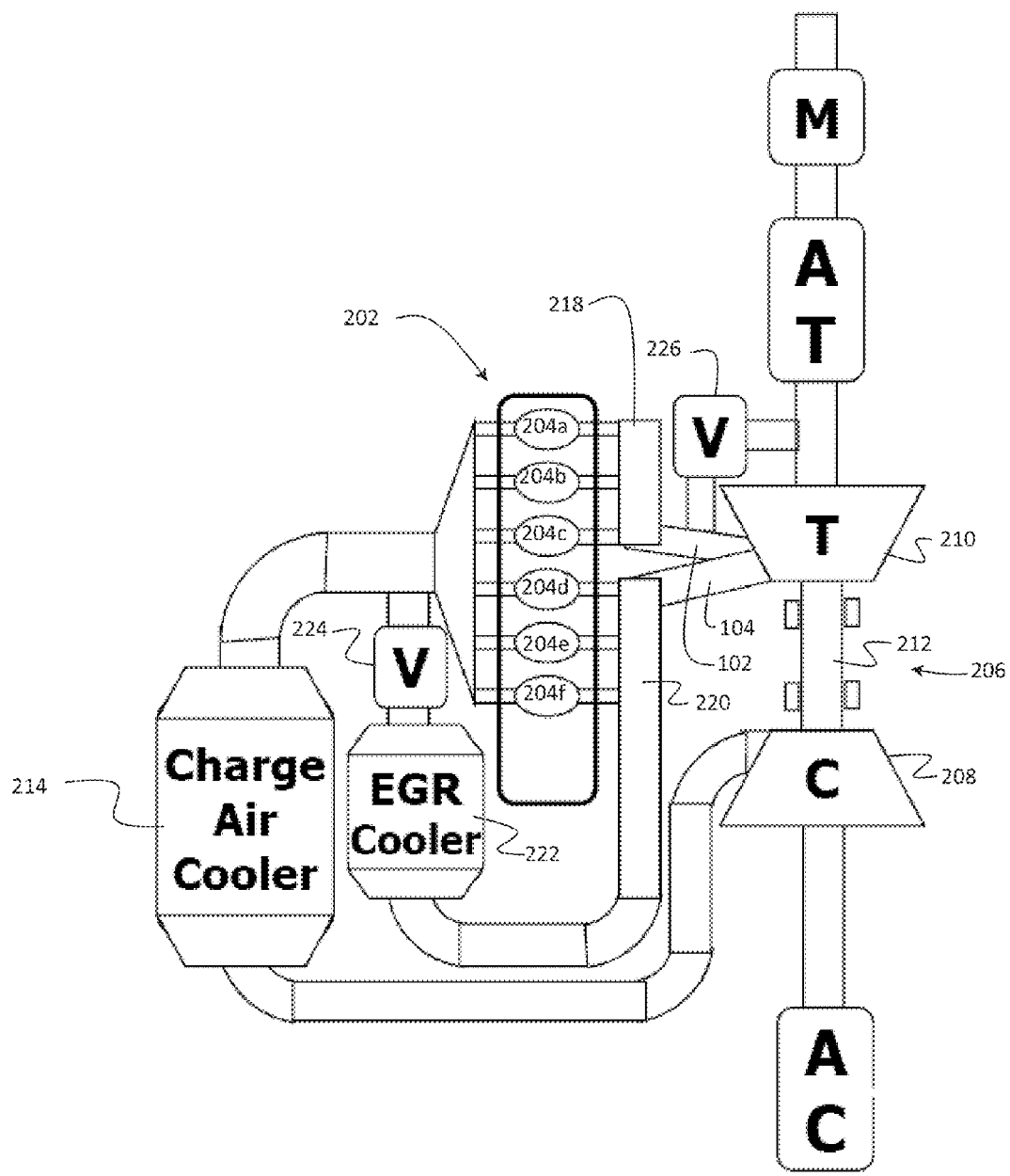
FIG. 2 is a schematic representation of a prior art diesel engine system with EGR employing an unequal volute exhaust manifold and wastegate.
Figure 3:
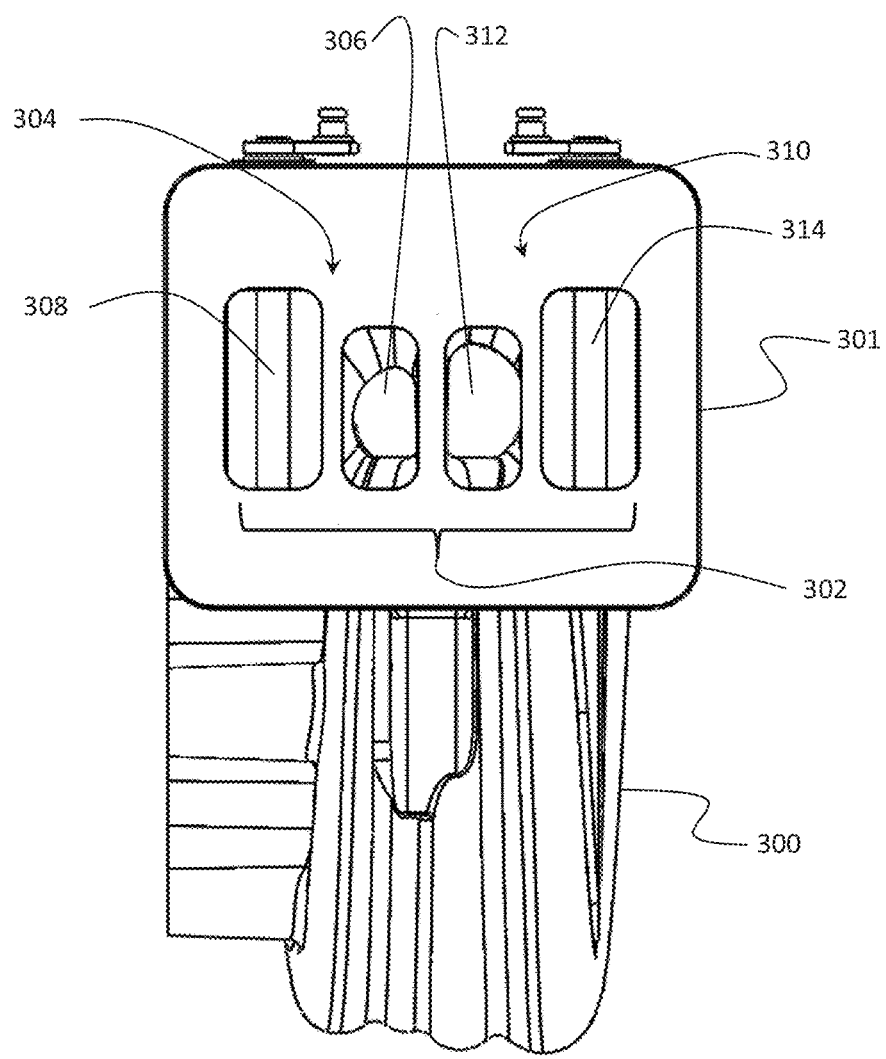
FIG. 3 is an end view of the manifold inlet and turbine housing
Figure 4:
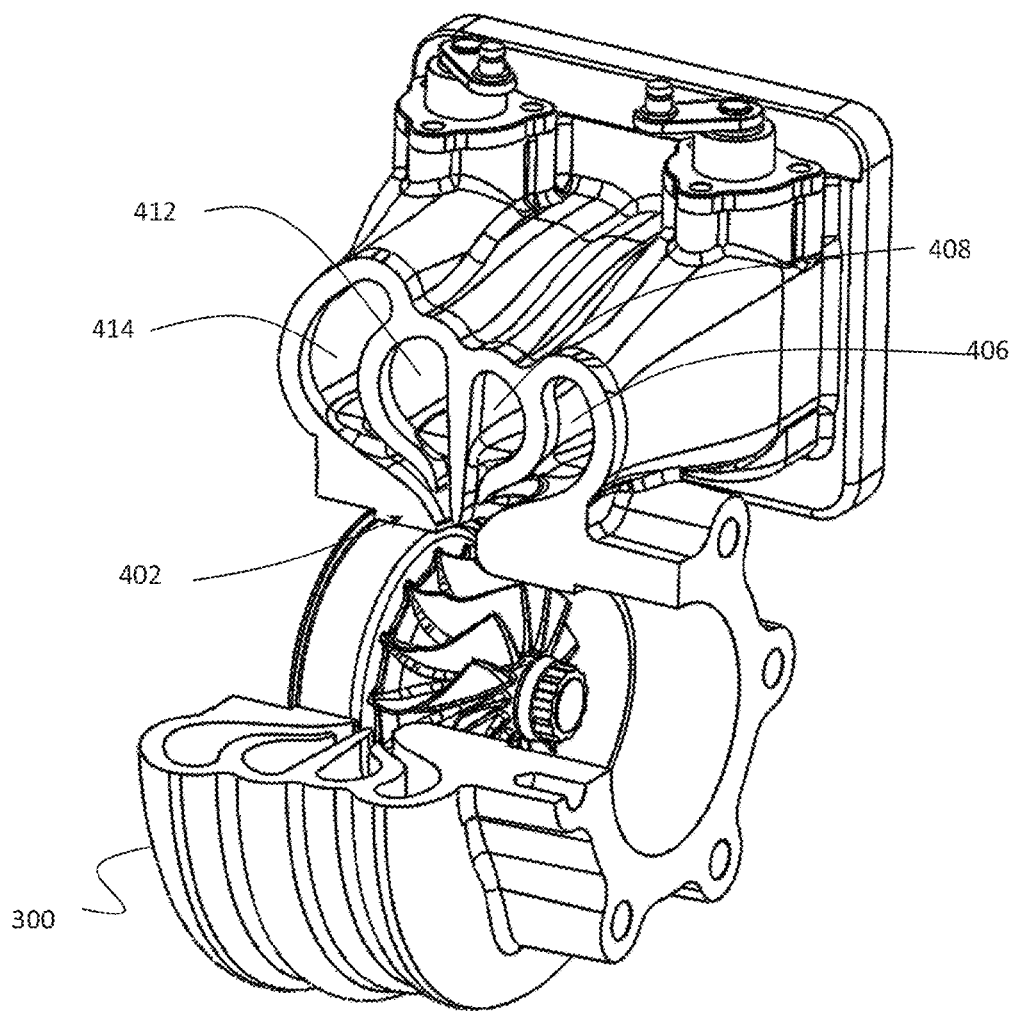
FIG. 4 is an isometric section view of the turbine housing showing the multipassage volute.

The embodiments described herein provide a low cost VGT that utilizes multiple volutes and valves to control the flow to the various volutes. The volutes are sized to provide different flow characteristics and thus provide true variable geometry turbine functionality. The embodiments receive 100% of the exhaust gases for EGR from one portion or bank of the engine's cylinders while allowing the remaining cylinders operate without the negative pressure gradient constraints necessary for EGR. For descriptive purposes, passages, volutes, or manifolds connected to the cylinders providing EGR-driving pressure differential will be defined as "EGR-driving passages", "EGR-driving volutes" and "EGR-driving manifolds" while passages, volutes or manifolds connect to the cylinders which do not provide EGR-driving pressure differential will be defined as "non-EGR-driving passages", "non-EGR-driving volutes" and "non-EGR-driving manifolds". The embodiment, characterized as a Quad Layer Passage (QLP) volute can enhance an EGR emission control system by providing additional control of the EGR and boost level independently. To maximize the QLP volute for asymmetrical boosting, four passages are provided in a divided exhaust inlet into the turbine housing 300 of the turbocharger with an inlet flange 301 of the four passage divided exhaust inlet 302 is shown in FIG. 3. An isometric section view of the multipassage volute 402 is shown in FIG. 4. On a first side 304 of the exhaust inlet 302, a first EGR-driving passage 306 and the associated first EGR-driving volute 406 is sized for driving EGR at the maximum desired rate and a second EGR-driving passage 308 and second EGR-driving volute 408 is connected to the same set of cylinders, but with a control valve, as will be described in greater detail subsequently, for controlled flow into the second EGR-driving passage. The second EGR-driving passage 308 and associated second EGR-driving volute 408 has a larger A/r (defined as the area of the throat section of the volute divided by the radius of the centroid of the area), which is the key parameter determining the flow characteristic of the volute. The larger A/r EGR-driving passage 308 is opened with the control valve when maximum EGR is not required, thus reducing the back pressure on the engine.

A second side 310 of the exhaust inlet 302 also has two passages with different A/r. The smaller non-EGR-driving passage 312 and associated volute 412 is designed to provide the necessary power to the turbine to provide the desired air flow when maximum EGR is required. In prior art devices, a wastegate would be provided to lower the boost when less air flow was required, but as the name indicates, that is a wasteful method of control. In the present embodiment, the second non-EGR-driving passage 314 and associated volute 414 has a larger A/r and an associated control valve, as will be described in greater detail subsequently. When less boost is required, flow is allowed to flow into larger A/r second non-EGR-driving passage 314 as well as the smaller passage 312, thus reducing the power production of the turbine 404 while also reducing the back pressure without requiring a wastegate.

Figure 5:
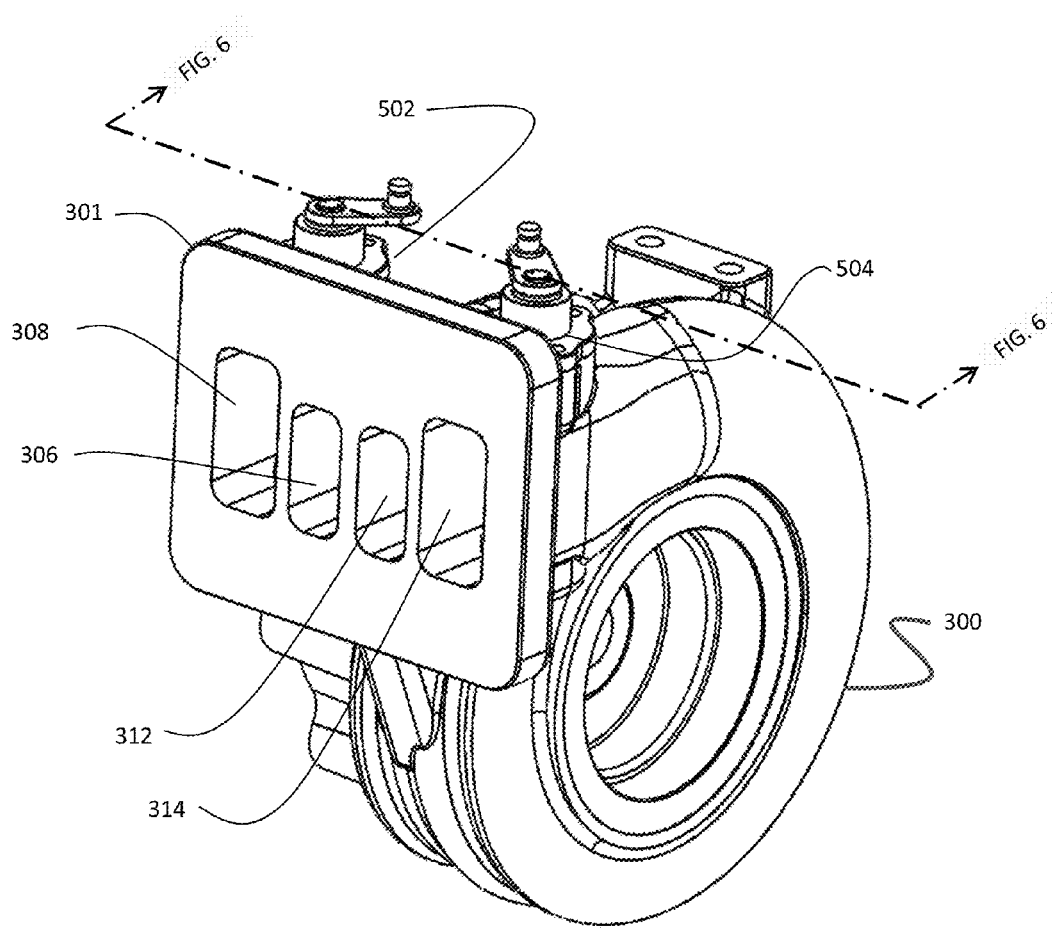
FIG. 5 is an isometric view of the turbine housing showing the control valve structure for the EGR and non-EGR large A/r volutes.
Figure 6:
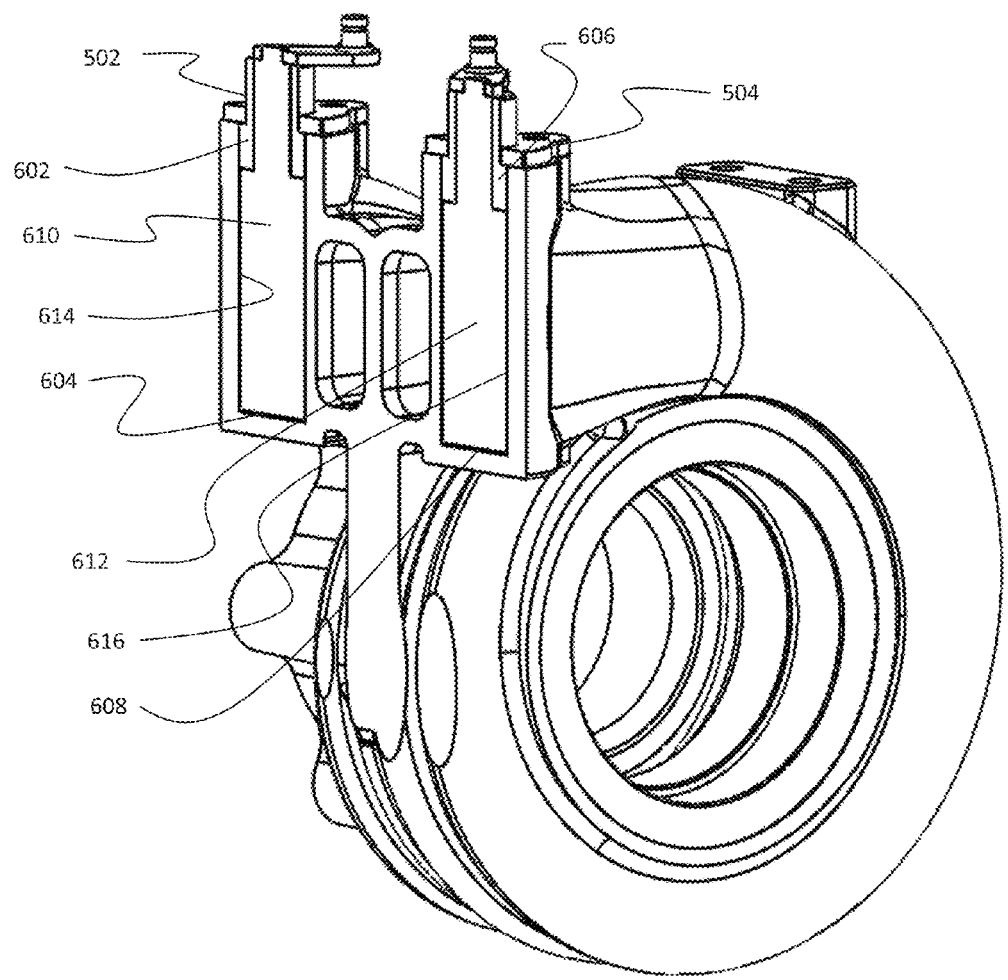
FIG. 6 is a partial section view showing the internal characteristics of the control valves.

FIG. 5 shows the complete turbine housing 300 with first control valve 502 in the inlet flow of second EGR-driving passage 308 and a second control valve 504 in the inlet flow of the second non-EGR-driving passage 314. For exemplary embodiments, the control valves are simple non-sealing rotating cylindrically-shaped valves as shown in FIG. 6 with the turbine housing shown in phantom to view the valves. Each valve is essentially non-contacting except at the bearing supports 602, 604 and 606, 608 for valves 502 and 504 respectively. For the exemplary embodiment, the valve blades 610 and 612 provide leakage in the form of a gap, for an exemplary embodiment approximately a 0.5 mm, from the valve barrel inner surfaces 614, 616 allowing leakage around the valves to fill the second EGR-driving passage 308 and second non-EGR-driving passage 314, which would be filled by back flow from the smaller first EGR-driving volute 406 and non-EGR-driving volute 412 if not for the leakage flow. In alternative embodiments sealing valves may be employed.

Figure 7:
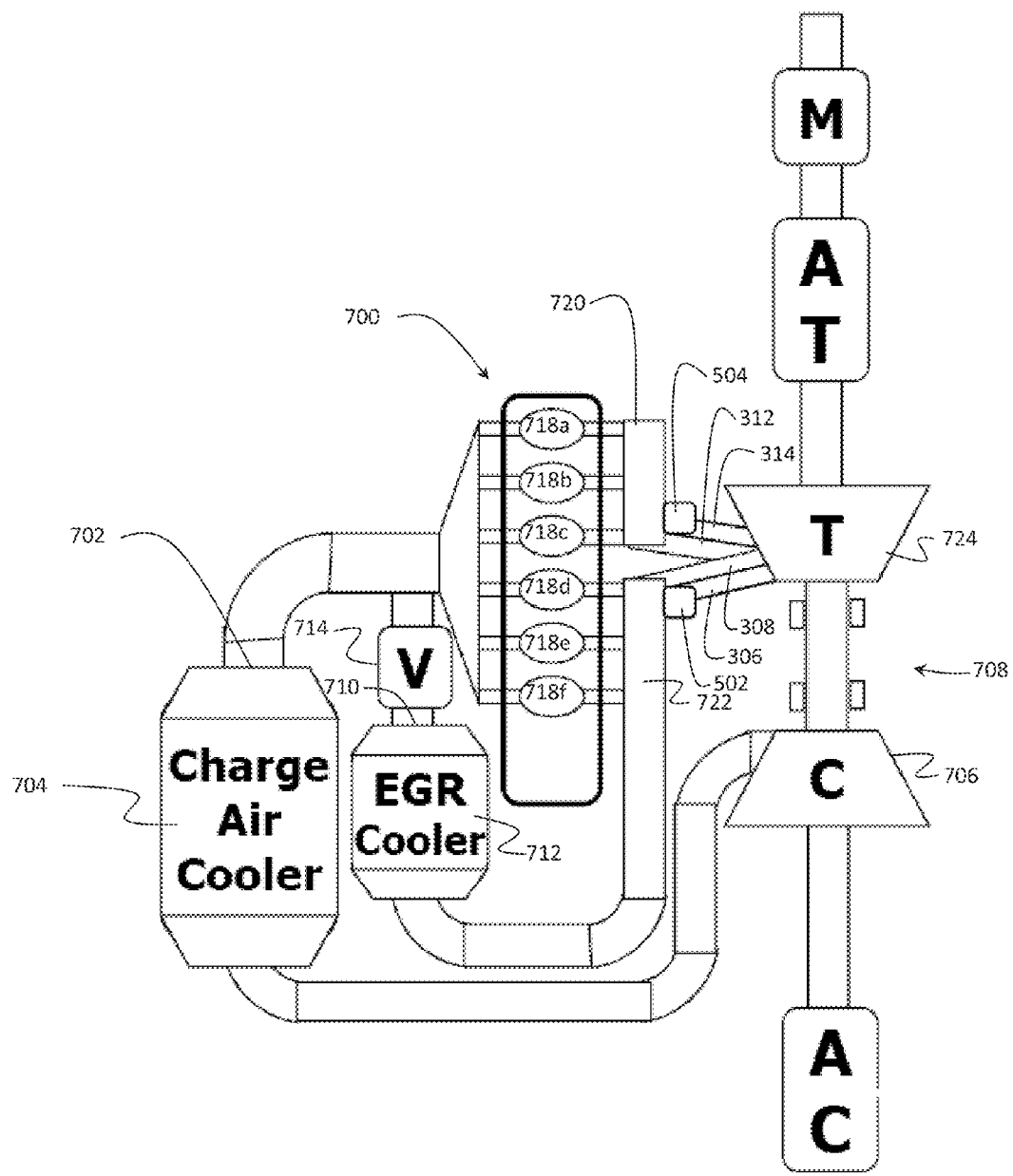
FIG. 7 is a schematic block diagram representation of a diesel engine system employing the disclosed embodiment of the QLP volute variable geometry turbine.

A schematic diagram of a diesel engine system 700 employing the disclosed embodiment is shown in FIG. 7. At an exit 702 of a charge air cooler 704, the gas flow is simply the charge air flow provided by the compressor 706 of the turbocharger 708 and can be expressed as:

$$\dot{m}_{air}$$

At the exit 710 of an EGR cooler 712, the gas flow is the EGR flow being returned to the engine. A valve 714 controls EGR flow into the engine. The flow at the exit 710 may be expressed as:

$$\dot{m}_{egr}$$

An inlet manifold 716 receives the charge air flow from the charge air cooler 704 and the EGR cooler 712 through EGR mixer 717 and the gas flow is a combination of the charge air and EGR and may be expressed as:

$$\dot{m}_{air} + \dot{m}_{egr}$$

For the example engine a 6 cylinder structure is employed with cylinders 718a-718f. A non-EGR exhaust manifold 720 receives exhaust gas from a first bank of three cylinders 718a-718c. An EGR exhaust manifold 722 receives exhaust gas from a second bank, the remaining three cylinders 718d-718f. The EGR exhaust manifold 722 is also connected to an inlet 724 of the EGR cooler 712. All EGR is provided by the EGR cylinders 718d-718f. The flow properties at the non-EGR exhaust manifold and EGR exhaust manifold connections to the respective inlets 304 and 310 to the turbine housing are substantially identical for a one dimensional (1D) analysis. In reality, there will be a difference in backpressure on the two different exhaust manifold banks resulting in a slight difference in engine volumetric efficiency. This effect is negligible for a matching and a 1D system analysis. Total mass flow from each bank may be expressed as:

$$(\dot{m}_{air} + \dot{m}_{fuel} + \dot{m}_{egr})/2$$

The combined outlet of first EGR-driving passage 306 and second EGR driving passage 308 will have one half of the engine flow, which consists of air, fuel and EGR, but has the total EGR flow split off prior to entering the turbine.

$$(\dot{m}_{air} + \dot{m}_{fuel} + \dot{m}_{egr})/2 - \dot{m}_{egr}$$

The combined outlet of the volutes 412 and 414 from first non-EGR-driving passage 312 and second non-EGR-driving passage 314 will have one half of the engine flow, but it will be split by the control valve 504 between a smaller and larger passage. The total flow is $$(\dot{m}_{air} + \dot{m}_{fuel} + \dot{m}_{egr})/2$$

In consideration for the EGR flow requirements controlled by control valve 502 altering back pressure by adjusting flow between EGR-driving passages 306 and 308, the flow from the non-EGR-driving manifold 720 will be split by the control valve 504 into non-EGR-driving passages 312 and 314 to achieve flow in the volutes 412 and 414 for the correct total power from the turbine 724, which produces the desired total air flow from the compressor 706 to the engine. The embodiments disclosed minimize the impact of EGR on the engine pumping loop. The boosting system uses a combination of the Quad Layer Passage Variable Geometry Turbine and the Asymmetrical Volute Boosting system in a configuration that drives all the EGR from the second bank of cylinders 718d-718f leaving the first bank of cylinders 718a-718c to operate at a lower expansion ratio saving pumping work. Each bank of cylinders connects to a pair of unequal volutes. The smaller volute provides more back pressure and more turbine power than the larger volute. The control valve 502 is used to control EGR rate through adjusting backpressure, while control valve 504 is used to control the overall boost level of the turbocharger.

Figure 8:
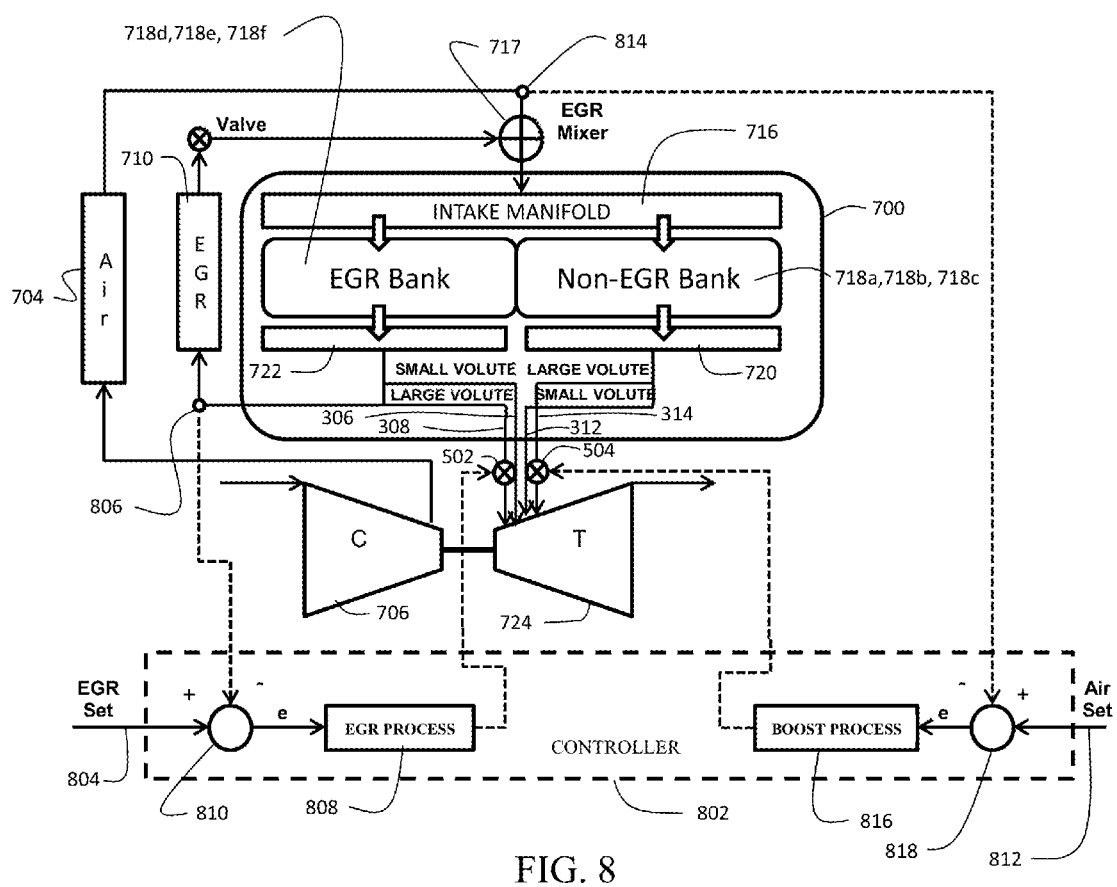
FIG. 8 is a schematic block diagram of the control elements for the QLP volute variable geometry turbine.

Control of the QLP volute variable geometry turbine is accomplished by a controller 802 as shown in FIG. 8. The controller 802 receives an EGR set signal 804 from a master engine controller (not shown). The EGR set signal is compared to an output of a flow sensor 806 associated with the EGR cooler 710 or other signal responsive to the EGR flow providing an indication of actual EGR flow. An EGR process element 808 controls the valve 502 responsive to the output of comparator 810 to produce the back pressure in the EGR exhaust manifold 722 required for the EGR flow to meet the EGR set signal. Overall engine boost is then controlled by an Air set signal 812 received by the controller 802 from the master engine controller. The Air set signal is compared to actual air flow at the EGR Mixer 717 with the output of a flow sensor 814 or other sensor responsive to the air flow and proportional to the actual air flow. A Boost process element 816 controls valve 504 responsive to the output of comparator 818 to provide the desired boost resulting in the air flow meeting the Air set signal. The EGR process element 808 and Boost process element 816 may be implemented as software subroutines in a microprocessor, dedicated logic gate arrays or analog componentry as may be desired.

Figure 9:
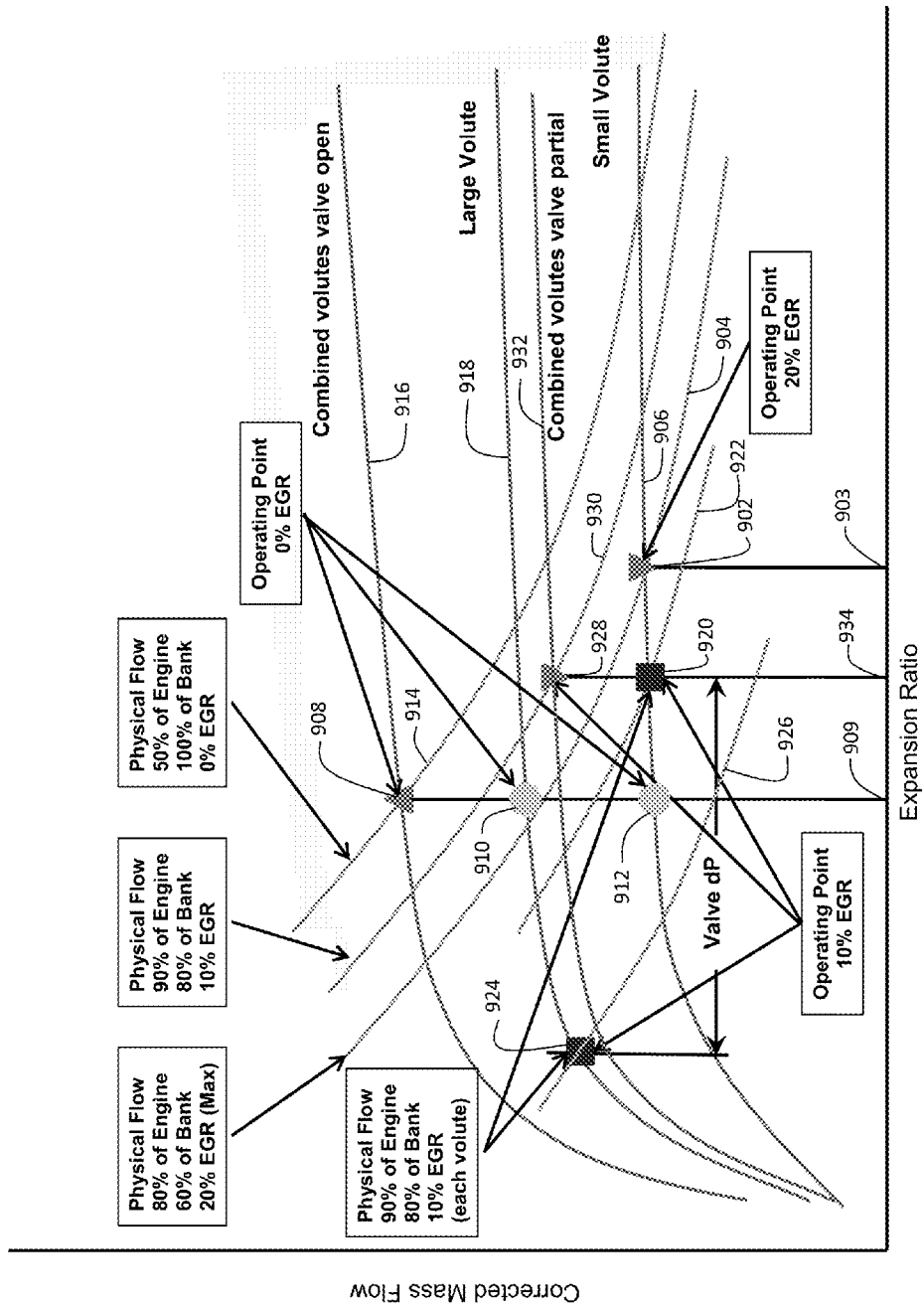
FIG. 9 is a graphical depiction of flow characteristics in the EGR-driving passages and volutes at various operating conditions.

Back pressure for controlling EGR flow in the engine and overall boost provided by the turbocharger to the engine are controlled using the first and second control valves 502, 504. FIG. 9 demonstrates the effect of operation of the first control valve 502. With the valve 502 closed, flow is substantially directed through the first or small EGR-driving passage 306 and associated volute 406 producing maximum back pressure and therefor maximum EGR flow. In the example of FIG. 9, a 20% EGR flow is the predetermined maximum flow and is shown at point 902 providing an expansion ratio 903. Physical flow through the small volute at the maximum flow is shown in trace 904 while corrected mass flow for the small volute is shown on trace 906. With the first control valve 502 fully open to produce the minimum back pressure and substantially 0 EGR flow, flow for the combined volutes is shown at point 908 with an expansion ratio 909 representing the sum of flow through the large volute represented by point 910 and flow through the small volute represented by point 912. Physical flow for the combined volutes is shown on trace 914 while corrected mass flow is shown on trace 916. Corrected mass flow for the small volute is again shown on trace 906 while corrected mass flow is shown on trace 918. In an intermediate condition with the first control valve 502 modulated to a partially open position, for the example 10% EGR flow, the small volute carries a portion of the overall flow represented by point 920 at a physical flow represented by trace 922. The large volute carries a portion of the flow represented by point 924 at a physical flow shown on trace 926 controlled by the differential pressure, dP, created by flow through the valve. The resulting total flow is shown by point 928 which results in a physical flow represented by trace 930 and a corrected mass flow as shown by trace 932 which results in an expansion ratio 934 providing back pressure to drive the desired EGR level.

Figure 10:
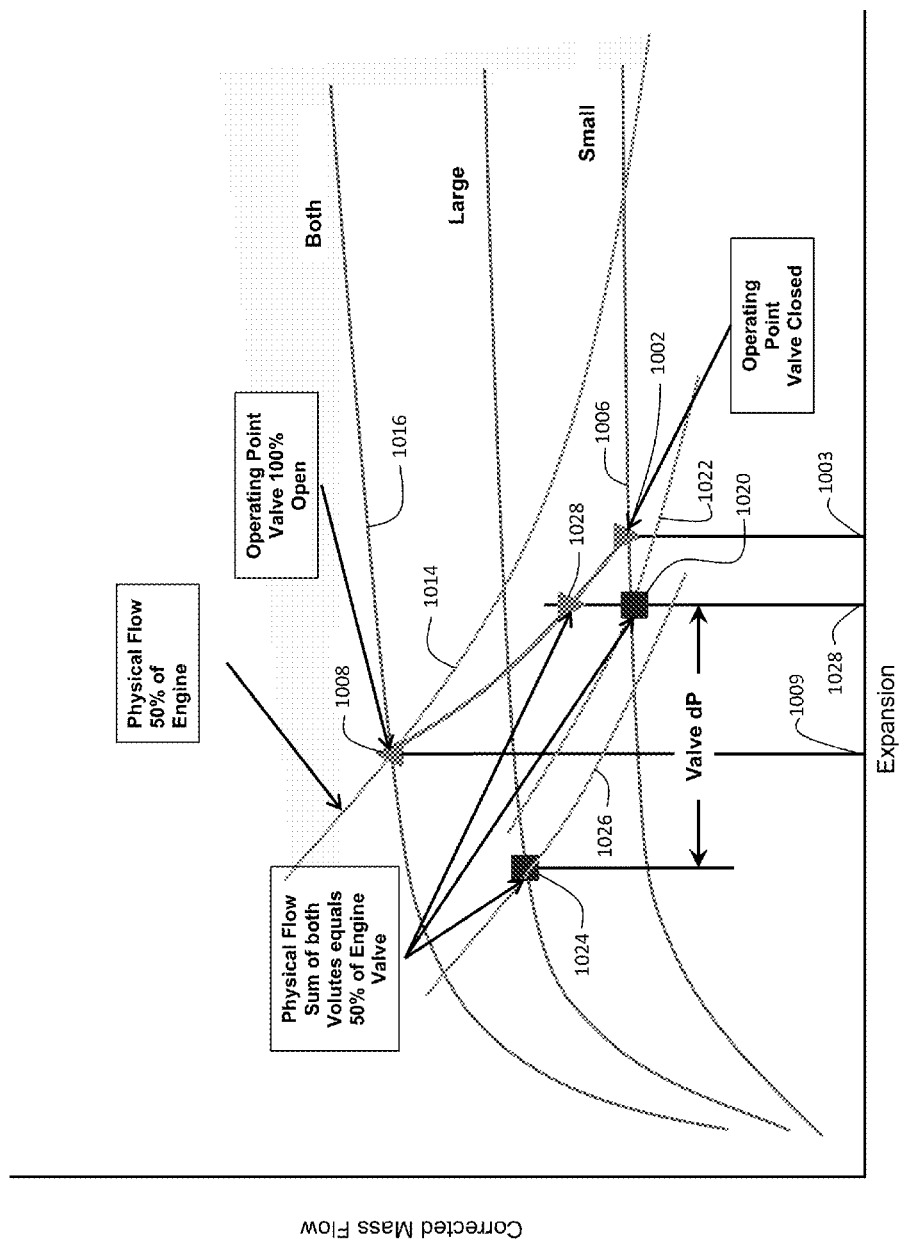
FIG. 10 is a graphical depiction of flow characteristics in the non-EGR-driving passages and volutes at various operating conditions; and, FIG. 11 is a graphical depiction of interaction of the control valves moved to illustrate their effect on A/F, Boost, and EGR rate with the engine running at a fixed load and speed.

FIG. 10 demonstrates the effect of operation of the second control valve 504 for boost control. With the valve 504 closed, flow is substantially directed through the first or small non-EGR-driving passage 312 and associated volute 412 producing maximum boost. In the example of FIG. 10 the predetermined maximum flow is shown at point 1002 providing an expansion ratio 1003. Corrected mass flow for the small volute is shown on trace 1006. With the first control valve 502 fully open to produce the minimum boost, flow for the combined volutes is shown at point 1008 with an expansion ratio 1009 representing the sum of flow through the large volute and small volute. Physical flow for the combined volutes is shown on trace 1014 while corrected mass flow is shown on trace 1016. In an intermediate condition with the second control valve 504 modulated to a partially open position to reduce boost the small volute carries a portion of the overall flow represented by point 1020 at a physical flow represented by trace 1022. The large volute carries a portion of the flow represented by point 1024 at a physical flow shown on trace 1026. The resulting total flow is shown by point 1028 which results in an expansion ratio 1028 to provide the desired boost.

Figure 11:
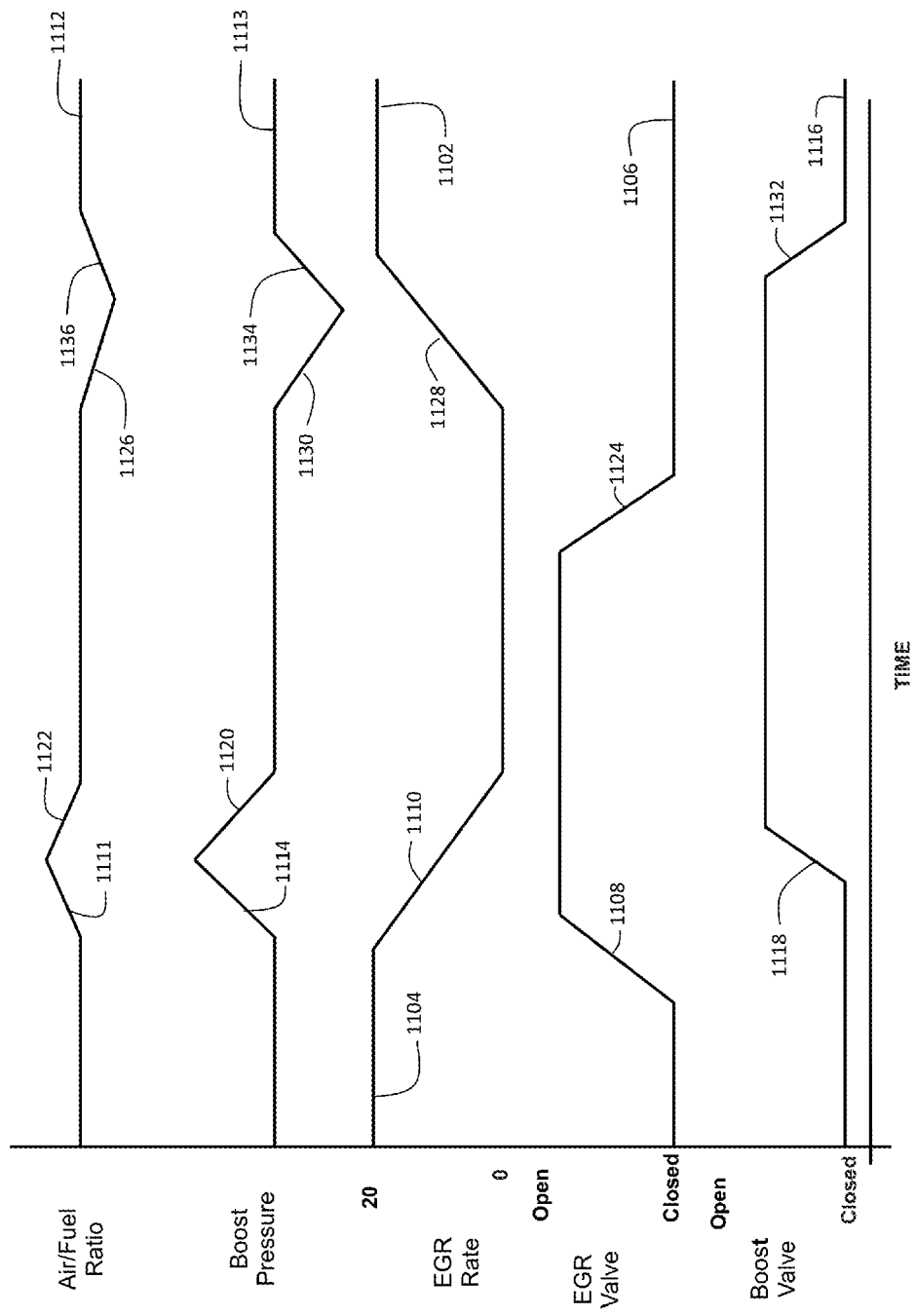

The mutual operation of the control valves to provide EGR rate control and boost control is demonstrated in FIG. 11 for engine running at a fixed load and speed. The effect of turning EGR on/off and the subsequent controlling of boost to achieve a target AF is shown in a time based plot. EGR rate is shown by trace 1102 and initially is operating at a 20% EGR rate as shown by segment 1104. Position of the first control valve 502 is shown by trace 1106. If the EGR valve, first control valve 502, is closed as shown by segment 1108 to reduce EGR rate which occurs as shown in segment 1110, air/fuel ratio increases as shown by segment 1111 of trace 1112. Boost pressure is shown as trace 1113 and the reduction in EGR shown in segment 1110 and increase in air/fuel ratio shown in segment 1111 results in an increase in boost pressure as represented by segment 1114. In response, second control valve 504, whose position is shown by trace 1116 opens as shown by segment 1118 which induces a corresponding reduction in boost pressure as indicated by segment 1120, with a correspondent reduction in air/fuel ratio as shown by segment 1122. The opposite effects then occur upon closing of the EGR valve as shown by segment 1124, air/fuel ratio decreases as shown by segment 1126. The increasing EGR shown in segment 1128 and decrease in air/fuel ratio shown in segment. 1126 results in an decrease in boost pressure as represented by segment 1130. In response, the boost control valve, second control valve 504, closes as shown by segment 1132 which induces a corresponding increase in boost pressure as indicated by segment 1134, with a correspondent increase in air/fuel ratio as shown by segment 1136.

For sizing of the EGR and non-EGR-driving passage and volute pairs, the different corrected flows and expansion ratios are calculated for each of the four volutes. For each operating point of the turbocharger based on engine demand, the compressor is matched first. The compressor power is calculated for the corrected flow, pressure ratio and efficiency of the compressor. This total power must be produced by the turbine stage.

Before calculating the turbine requirements, the pressure gradient that is required for the EGR flow rate is calculated from the EGR cooler and piping flow characteristics. This pressure gradient is added to the boost pressure of the compressor to arrive at the required EGR driving pressure in exhaust manifold 722 in FIG. 7.

All the Expansion Ratio/Corrected Flow operating points for the EGR small passage are plotted. The point requiring the lowest corrected flow/exhaust recirculation (ER) point is chosen as the design point. The small volute on the EGR bank is sized to produce this flow. The size of the combined large and small volutes on the EGR bank is chosen to match the largest corrected flow/ER point. After the flows and expansion ratio of the EGR-driving passages and associated volutes are known, the turbine power resulting from that portion of turbine flow can be calculated. The non-EGR-driving passages and associated volutes must provide the difference between the required compressor power plus bearing loss and the power produced by the EGR bank of flow. The small non-EGR-driving passage and associated volute is sized to provide the turbine power for maximum EGR with maximum required engine boost. The large non-EGR-driving passage and associated volute is sized to provide appropriate reduction in the expansion ratio for the minimum boost condition.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A variable geometry turbine for turbochargers in exhaust gas recirculation engines comprising:
    a turbine housing having an exhaust inlet with a first side receiving exhaust from cylinders having exhaust gas recirculation (EGR) and a second side receiving exhaust from non-EGR cylinders, said first side having a first EGR-driving passage and a second EGR-driving passage and said second side having a first non-EGR-driving passage and a second non-EGR-driving passage;
    a first control valve associated with the second EGR-driving passage;
    a second control valve associated with the second non-EGR-driving passage; and,
    a controller adapted to independently control the first and second control valves to establish EGR flow rate and boost control.

2. The variable geometry turbine for turbochargers in exhaust gas recirculation engines as defined in claim 1 wherein the first EGR-driving passage is sized to provide a back pressure driving a predetermined maximum EGR rate.

3. The variable geometry turbine for turbochargers in exhaust gas recirculation engines as defined in claim 2 wherein with the first control valve in a fully opened position the second EGR-driving passage is sized in combination with the first EGR-driving passage to provide a second back pressure driving a predetermined minimum EGR rate.

4. The variable geometry turbine for turbochargers in exhaust gas recirculation engines as defined in claim 2 wherein the first non-EGR-driving passage is sized to provide a predetermined maximum boost.

5. The variable geometry turbine for turbochargers in exhaust gas recirculation engines as defined in claim 4 wherein with the second control valve in a fully opened position the second non-EGR-driving passage is sized to provide a predetermined minimum boost.

6. The variable geometry turbine for turbochargers in exhaust gas recirculation engines as defined in claim 1 wherein the controller controls the first control valve responsive to a comparison of an EGR set signal and a signal responsive to EGR flow.

7. The variable geometry turbine for turbochargers in exhaust gas recirculation engines as defined in claim 1 wherein the controller controls the second control valve responsive to a comparison of an Air set signal and a signal responsive to air flow.

8. The variable geometry turbine for turbochargers in exhaust gas recirculation engines as defined in claim 1 wherein area of a throat section of a volute divided by a radius of a centroid of the area (A/r) of the second EGR-driving passage and a first associated volute exceeds the A/r of the first EGR-driving passage and a second associated volute.

9. The variable geometry turbine for turbochargers in exhaust gas recirculation engines as defined in claim 1 wherein area of a throat section of a volute divided by a radius of a centroid of the area (A/r) of the second non-EGR-driving passage and a first associated volute exceeds the A/r of the first non-EGR-driving passage and a second associated volute.

10. An engine with exhaust gas recirculation (EGR) comprising:
    a plurality of non-EGR cylinders with a first exhaust manifold;
    a plurality of EGR cylinders with a second exhaust manifold;
    a turbocharger having
    a compressor;
    a turbine connected to drive the compressor with a turbine housing having an exhaust inlet with a first side connected to the first exhaust manifold and a second side connected to the second manifold, said first side having a first non-EGR-driving passage and a second non- EGR-driving passage and said second side having a first EGR-driving passage and a second EGR-driving passage;
a first control valve associated with the second EGR-driving passage;
a second control valve associated with the second non-EGR-driving passage; and,
a controller adapted to independently control the first and second control valves to establish EGR flow rate and boost control.

11. The engine as defined in claim 10 wherein the compressor is connected to an EGR mixer providing charge air to an inlet manifold connected to the plurality of non-EGR cylinders and the plurality of EGR cylinders, said second exhaust manifold connected to the EGR mixer.

12. The engine as defined in claim 11 further comprising:
a charge air cooler intermediate the compressor and the EGR mixer; and,
an EGR cooler intermediate the second exhaust manifold and the EGR mixer.

13. The engine as defined in claim 10 wherein the first EGR-driving passage is sized to provide a back pressure driving a predetermined maximum EGR rate.

14. The engine as defined in claim 13 wherein with the first control valve in a fully opened position the second EGR-driving passage is sized to provide a second back pressure driving a predetermined minimum EGR rate.

15. The engine as defined in claim 13 wherein the first non-EGR-driving passage is sized to provide a predetermined maximum boost.

16. The engine as defined in claim 15 wherein with the second control valve in a fully opened position the second non-EGR-driving passage is sized to provide a predetermined minimum boost.

17. The engine as defined in claim 10 wherein the controller controls the first control valve responsive to a comparison of an EGR set signal and an actual EGR flow signal.

18. The engine as defined in claim 10 wherein the controller controls the second control valve responsive to a comparison of an Air set signal and an actual air flow signal.

19. The engine as defined in claim 10 wherein area of a throat section of a volute divided by a radius of a centroid of the area (A/r) of the second EGR-driving passage and a first associated volute exceeds the A/r of the first EGR-driving passage and a second associated volute.

20. A method for exhaust recirculation control comprising:
drawing exhaust from a plurality of non-EGR cylinders in an engine with a first exhaust manifold;
drawing exhaust from a plurality of EGR cylinders in the engine with a second exhaust manifold;
receiving exhaust from the first exhaust manifold in a turbine exhaust inlet with a first side having a first EGR-driving passage and a second EGR-driving passage connected to the first exhaust manifold;
controlling exhaust flow between the first EGR-driving passage and the second EGR-driving passage with a first control valve associated with the second EGR-driving passage to control back pressure for EGR flow;
receiving exhaust from the second exhaust manifold in a second side of the turbine exhaust inlet having a first non-EGR-driving passage and a second non-EGR-driving passage connected to the second manifold;
controlling exhaust flow between the first non-EGR-driving passage and the second non-EGR-driving passage with a second control valve associated with the second non-EGR-driving passage to control boost.

* * * * *